United States Patent
You et al.

(10) Patent No.: US 9,641,231 B2
(45) Date of Patent: May 2, 2017

(54) METHOD AND APPARTUS FOR MODULATING BASEBAND SIGNAL IN BEAM SPACE MULTI-INPUT MULTI-OUTPUT

(71) Applicant: ELECTRONICS AND TELECOMMUNICATIONS RESEARCH INSTITUTE, Daejeon (KR)

(72) Inventors: Duk Hyun You, Daejeon (KR); Seung Eun Hong, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 14/844,783

(22) Filed: Sep. 3, 2015

(65) Prior Publication Data

US 2016/0072561 A1    Mar. 10, 2016

(30) Foreign Application Priority Data

Sep. 5, 2014  (KR) .................. 10-2014-0119332
Jul. 20, 2015  (KR) .................. 10-2015-0102618

(51) Int. Cl.
*H04B 7/02* (2017.01)
*H04B 7/0413* (2017.01)
*H04B 7/06* (2006.01)

(52) U.S. Cl.
CPC ......... *H04B 7/0413* (2013.01); *H04B 7/0617* (2013.01)

(58) Field of Classification Search
CPC ..... H04L 1/0618; H04L 1/06; H04L 25/0204; H04L 27/2647; H04L 5/0007; H04L 27/2657; H04L 27/2662; H04L 5/0048; H04L 25/4902; H04L 1/0009; H04L 1/0041; H04L 25/49; H04B 7/0417; H04B 7/0669; H04B 3/54
USPC ........ 375/267, 260, 259, 295, 316, 219, 367
See application file for complete search history.

(56) References Cited

U.S. PATENT DOCUMENTS

| | | | |
|---|---|---|---|
| 6,349,216 B1* | 2/2002 | Alberth, Jr. ........... | H03F 1/0222 375/296 |
| 2003/0112898 A1 | 6/2003 | Song et al. | |
| 2005/0088358 A1 | 4/2005 | Larry et al. | |
| 2005/0207509 A1* | 9/2005 | Saunders ............... | H04B 1/525 375/285 |
| 2008/0122723 A1* | 5/2008 | Rofougaran ........... | H01Q 9/145 343/861 |
| 2011/0142177 A1 | 6/2011 | Kang et al. | |
| 2013/0135163 A1* | 5/2013 | Desclos ................. | H01Q 21/28 343/745 |
| 2013/0147681 A1* | 6/2013 | Spears .................... | H03H 7/40 343/861 |

* cited by examiner

*Primary Examiner* — Zewdu Kassa
(74) *Attorney, Agent, or Firm* — Rabin & Berdo, P.C.

(57) ABSTRACT

A method and apparatus for modulating a baseband signal in beam space MIMO are provided. The baseband signal modulation apparatus may calculate a load value of a plurality of antenna elements using a baseband signal. The baseband signal modulation apparatus may change a phase or a magnitude of a baseband signal or a first band signal having a higher frequency than that of the baseband signal to correspond to the calculated load value.

18 Claims, 8 Drawing Sheets

METHOD AND APPARTUS FOR MODULATING BASEBAND SIGNAL IN BEAM SPACE MULTI-INPUT MULTI-OUTPUT

CROSS-REFERENCE TO RELATED APPLICATION

This application claims priority to and the benefit of Korean Patent Application No. 10-2014-0119332 and 10-2015-0102618 filed in the Korean Intellectual Property Office on Sep. 5, 2014 and Jul. 20, 2015, the entire contents of which are incorporated herein by reference.

BACKGROUND OF THE INVENTION (a) Field of the Invention

The present invention relates to a method and apparatus for modulating a baseband signal in beam space multi-input multi-output (MIMO).

(b) Description of the Related Art

Nowadays, in various communication technologies, a MIMO technique is adapted. Such a MIMO technique has a merit that can increase a data rate and maximize frequency efficiency. A Wibro system and a 3GPP cellular communication system as well as IEEE 802.16 and IEEE 802.20, which are portable Internet systems, adapt a MIMO technique.

A transmitting performance in such a MIMO communication system generally increases proportional to the number of antennas. Therefore, in order to maximize a MIMO performance, the number of antennas should be increased and thus the number of radio frequency (RF) chains also increases. When the antenna number increases, implementation complexity increases and a size of a system increases, and thus there is a drawback that the antenna number cannot be increased much. In order to deviate from such a restriction, nowadays, research for achieving MIMO performance using one RF chain or a small number of RF chains has been performed. As a representative example thereof, there is a beam space MIMO technology using an electrical steering parasitic array radiation (ESPAR) antenna or a load modulation antenna.

Such beam space MIMO technology is different from general MIMO technology in an antenna/RF aspect and a baseband aspect.

First, in an antenna/RF aspect, beam space MIMO technology will be described. General MIMO technology forms an antenna using a plurality of active antenna elements, but beam space MIMO technology forms an antenna using one active antenna element or a small number of active antenna elements and a plurality of parasitic antennas elements. Such beam space MIMO technology can obtain an increasing effect of the antenna number through a plurality of parasitic antennas elements and reduce a distance between a plurality of parasitic antenna elements. Further, because beam space MIO technology uses one RF chain or a small number of RF chains, an RF portion may be implemented with no complex portion and a small size.

In a baseband aspect, beam space MIMO technology will be described. General MIMO technology uses a plurality of active antenna elements and emits a baseband signal that is modulated on each active antenna basis. Accordingly, by a phase difference and a magnitude difference due to a path to which each signal is transferred, a phase and a magnitude of a signal that is finally emitted through an active antenna are determined. Beam space MIMO technology has a form in which a signal passes on each path basis, and a phase and a magnitude of each signal that is emitted from an antenna are affected by RF impairment such as phase noise of a local oscillator or IQ imbalance of a transmitting path. By measuring such RF impairment, in a baseband aspect, when compensation is performed or when an RF is formed, a system may be formed in consideration of such a specification. However, because such RF impairment (i.e., IQ imbalance or phase noise) is not rapidly changed but has an almost constant value, RF impairment may be compensated with a long cycle.

In beam space MIMO technology, when decomposing an entire antenna beam pattern that is generated by one active antenna or a small number of active antennas and a plurality of parasitic antennas, a plurality of orthogonal beams are generated. The baseband signal is mapped to such a plurality of orthogonal beams. A current value flowing to a plurality of parasitic antennas is changed by a baseband signal and an impedance value of a plurality of parasitic antennas, and thus an emission signal that is mapped to the beam is finally generated. A phase and a magnitude of a signal that is finally emitted by the current value are determined. That is, by changing a load value (impedance value of a plurality of parasitic antennas), a phase and a magnitude of a finally emitted signal are changed and thus a desired emission signal is generated.

A plurality of parasitic antennas are implemented by a variable impedance element, and a value of the variable impedance element is affected by a signal occurring in a baseband. That is, whenever a value of a signal occurring in a baseband changes, a load value should be changed. Therefore, whenever a baseband signal changes, tuning is required, and it is necessary that beam space MIMO technology tunes with a cycle faster than that of general MIMO technology.

In other words, in beam space MIMO, when symbols of each baseband signal are different, a phase difference (change) and a magnitude difference (change) are not constantly emitted in each symbol. Thereby, a phase and a magnitude of a finally emitted signal do not maintain a phase and a magnitude of a baseband. When measuring a phase and a magnitude of a channel with a reference signal, a portion in which a reference signal does not exist may have a phase and a magnitude that are different from those of a reference signal, and thus a problem may occur that normal channel estimation is impossible.

SUMMARY OF THE INVENTION

The present invention has been made in an effort to provide a method and apparatus for compensating a phase or a magnitude of a baseband in beam space MIMO.

An exemplary embodiment of the present invention provides a baseband modulation apparatus. The baseband modulation apparatus includes: an antenna array including a plurality of antenna elements and that emits a beam space multi-input multi-output (MIMO) signal; a baseband unit that generates a baseband signal; a band converter that converts the baseband signal to a first band signal having a higher frequency than that of the baseband signal; a load calculator that calculates a load value of the plurality of antenna elements using the baseband signal and that sets the calculated load value to the antenna array; a signal change controller that sets a change value of a value of at least one of a phase and a magnitude of the baseband signal to correspond to the calculated load value; and a signal change unit that changes at least one of the baseband signal and the first band signal to correspond to the change value.

The signal change controller may set the change value so that at least one of a phase change and a magnitude change of an antenna signal that is emitted through the antenna array is the same on each baseband signal basis.

The signal change controller may set the change value so that a phase change of an antenna signal that is emitted through the antenna array is the same on a baseband signal basis having the same phase.

The signal change controller may set the change value so that a magnitude change of an antenna signal that is emitted through the antenna array is the same on a baseband signal basis having the same magnitude.

The signal change unit may be located between the baseband unit and the band converter, when the signal change unit changes the baseband signal.

The signal change unit may be located between the band converter and the antenna array, when the signal change unit changes the first band signal.

The signal change unit may be implemented with at least one of a phase shifter, an amplifier, and an attenuator.

The plurality of antenna elements may include an active antenna element and a plurality of parasitic antennas elements, and the band converter may be a single radio frequency (RF) chain.

The first band signal may be an intermediate frequency (IF) band signal or an RF band signal.

Another embodiment of the present invention provides a baseband modulation apparatus. The baseband modulation apparatus includes: an antenna array including a plurality of antenna elements and that emits a beam space MIMO signal; a baseband unit that generates a baseband signal; an RF chain unit that converts the baseband signal to a radio frequency (RF) band signal; and a load calculator that calculates a first load value, which is a load value of the plurality of antenna elements, so that at least one of a phase change and a magnitude change of an antenna signal that is emitted through the antenna array is the same on each baseband signal basis and that sets the first load value to the antenna array.

The load calculator may calculate a second load value, which is a load value of the plurality of antenna elements, using the baseband signal, and change the second load value to the first load value so that at least one of a phase change and a magnitude change of the antenna signal is the same on the baseband signal basis.

The plurality of antenna elements may include an active antenna element and a plurality of parasitic antennas elements, and the RF chain unit may be a single RF chain.

Yet another embodiment of the present invention provides a method of modulating a baseband signal in beam space multi-input multi-output (MIMO) including a plurality of antenna elements. The method includes: generating the baseband signal; converting the baseband signal to a first band signal having a higher frequency than that of the baseband signal; calculating a load value of the plurality of antenna elements using the baseband signal; and changing a phase or a magnitude of the baseband signal or the first band signal to correspond to the calculated load value.

The changing of a phase or a magnitude may include: setting a change value of a phase or a magnitude of the baseband signal or the first band signal to correspond to the calculated load value; and changing the baseband signal or the first band signal to correspond to the change value.

The setting of a change value may include setting the change value so that a phase change or a magnitude change of an antenna signal that is emitted through the plurality of antenna elements is the same on the baseband signal basis.

The setting of a change value may include setting the change value so that a phase change of an antenna signal that is emitted through the plurality of antenna elements is the same on a baseband signal basis having the same phase.

The setting of a change value may include setting the change value so that a magnitude change of an antenna signal that is emitted through the plurality of antenna elements is the same on a baseband signal basis having the same magnitude.

The first band signal may be an intermediate frequency (IF) band signal or a radio frequency (RF) band signal.

According to an exemplary embodiment of the present invention, by changing a phase or a magnitude of a baseband signal according to a load value, a phase or a magnitude of the baseband signal can be compensated. Thereby, even in beam space MIMO, normal channel estimation can be performed.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and may include an entire function or a partial function of the MT, the AMS, the HR-MS, the SS, the PSS, the AT, and the UE.

Further, a base station (BS) may indicate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that performs a BS function, and a high reliability relay station (HR-RS) that performs a BS function, and may include an entire function or a partial function of the ABS, the node B, the eNodeB, the AP, the RAS, the BTS, the MMR-BS, the RS, and the HR-RS.

Hereinafter, in beam space MIMO, a method and apparatus for modulating a baseband signal will be described in detail.

In beam space MIMO, by decomposing a steering vector of a plurality of parasitic antennas, an orthogonal basic beam in which a baseband signal is to be transmitted is generated and a baseband signal is loaded in the basic beam. In this case, a steering vector of each antenna element is determined by a geometric structure of an antenna, and when a geometric structure of an antenna is changed, a steering vector of the antenna is changed. An operation that loads a baseband signal in the basic beam is performed by setting a current value flowing to each antenna (i.e., a parasitic antenna) with reference to the baseband signal. In this case, by changing a load value (load value of a parasitic antenna), a current value flowing to each antenna element is set.

In beam space MIMO, when determining a load value of each antenna element, a load value is determined through a ratio between an antenna element to be a reference and another antenna element. However, a load value of an antenna element to be a reference may be differently formed on each symbol basis, and accordingly, even though a phase change (difference) and a magnitude change (difference) of a current flowing to an antenna are finally normalized with a phase and a magnitude of a baseband signal, a load value may be differently generated on a symbol basis.

In general MIMO (when a plurality of active antennas exist), when an RF is an ideal RF, symbols that are emitted through a baseband signal and an antenna are located at the same point. That is, even in a case of normalizing on a symbol basis, a symbol is mapped to one point. Even when an RF is not an ideal RF (i.e., when a phase or a magnitude is not ideal), a distance ratio between a rotation angle and a starting point of a moving phase in an entire symbol is the same.

However, in beam space MIMO, even if an RF is an ideal RF, a signal that is transmitted in a baseband and a signal that is transmitted from an antenna are not located at the same point. That is, as described above, in beam space MIMO, a location of a signal that is transmitted in a baseband and a signal that is transmitted from an antenna are changed according to a load value. Such a case will be described in detail with reference to FIGS. 1 to 3.

Figure 1:
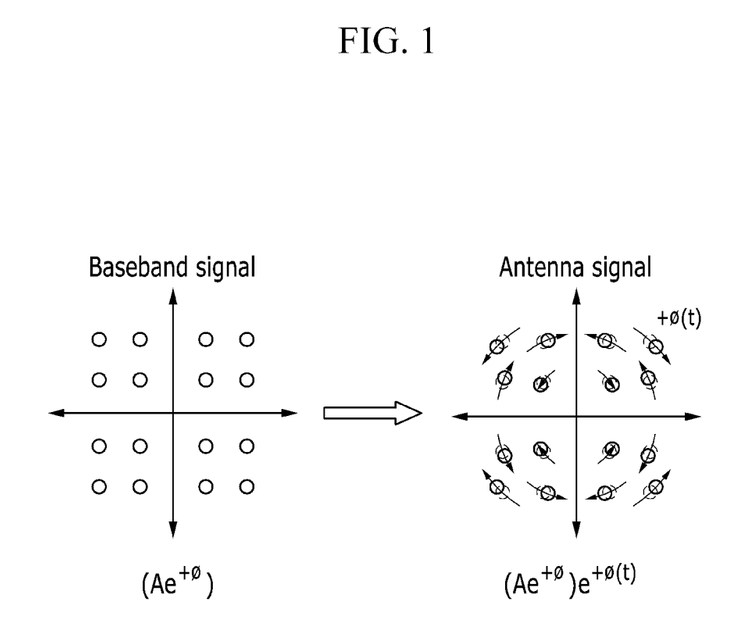
FIG. 1 is a diagram illustrating a case in which phase impairment occurs in beam space MIMO.
Figure 2:
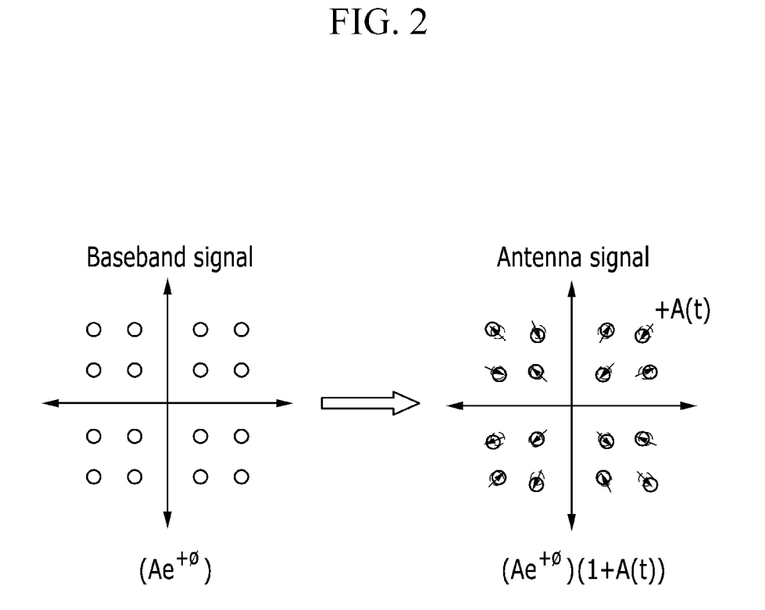
FIG. 2 is a diagram illustrating a case in which magnitude impairment occurs in beam space MIMO.
Figure 3:
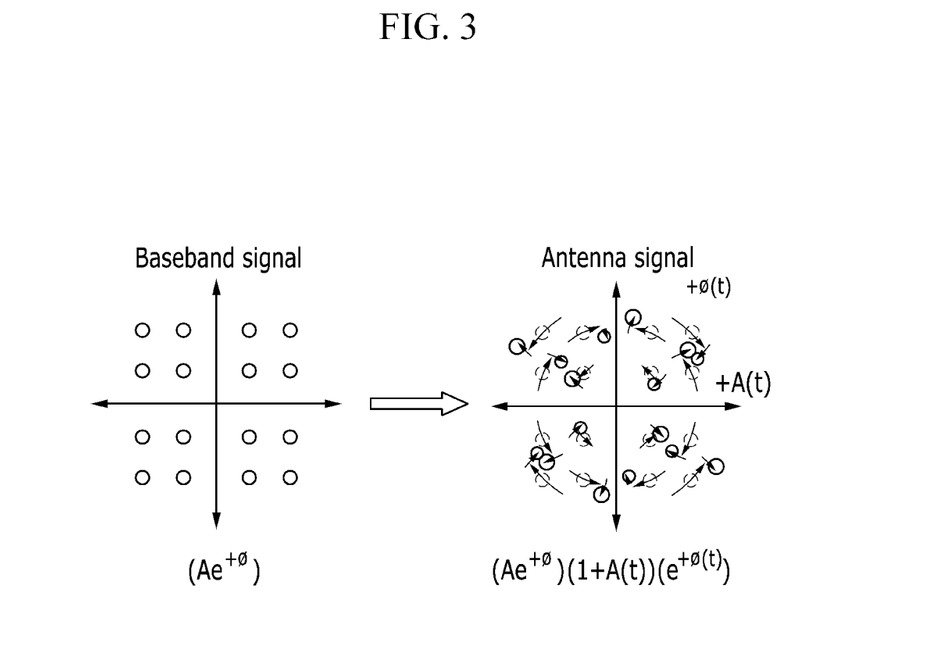
FIG. 3 is a diagram illustrating a case in which phase and magnitude impairment occurs in beam space MIMO.

FIG. 1 is a diagram illustrating a case in which phase impairment occurs in beam space MIMO, FIG. 2 is a diagram illustrating a case in which magnitude impairment occurs in beam space MIMO, and FIG. 3 is a diagram illustrating a case in which phase and magnitude impairment occurs in beam space MIMO.

As shown in FIG. 1, when a load value (load value that is set to a parasitic antenna) has an influence on only a phase, an antenna signal (signal emitted from an antenna) moves as one point on one circular arc.

As shown in FIG. 2, when a load value has an influence on only a magnitude, an antenna signal moves as one point on a straight line that connects each symbol (i.e., a baseband signal) and a starting point.

As shown in FIG. 3, when a load value has an influence on both a phase and a magnitude, an antenna signal moves as one point in a fan-shaped form. In this case, instead of the fan-shaped form, a doughnut shape, a circular piece shape, and a circle shape may represent.

Unlike general MIMO, in beam space MIMO, an angle rotating on each symbol basis and a distance ratio between a moved point and a starting point may be different even in an ideal RF. Because different load values may be generated on each symbol basis and because a phase difference (change) and a magnitude ratio (difference or change) of a current flowing to an antenna element is determined according to a load value, such a phenomenon may occur.

In order to solve such a problem, a method and apparatus for modulating a baseband signal according to an exemplary embodiment of the present invention compensate a change of a phase or a magnitude according to a load value. Such compensation may be performed at the transmitting side. Two methods of compensating a phase or a magnitude according to a load value exist. A first method is a method of changing a signal itself and a second method is a method of providing an additional condition to calculation of a load value.

The first method is a method of calculating a load value, calculating a phase change or a magnitude change of the calculated load value, and changing a corresponding signal to have the same phase change or magnitude change on each signal (symbol) basis.

A first method will be described with reference to FIGS. 4 to 6.

Figure 4:
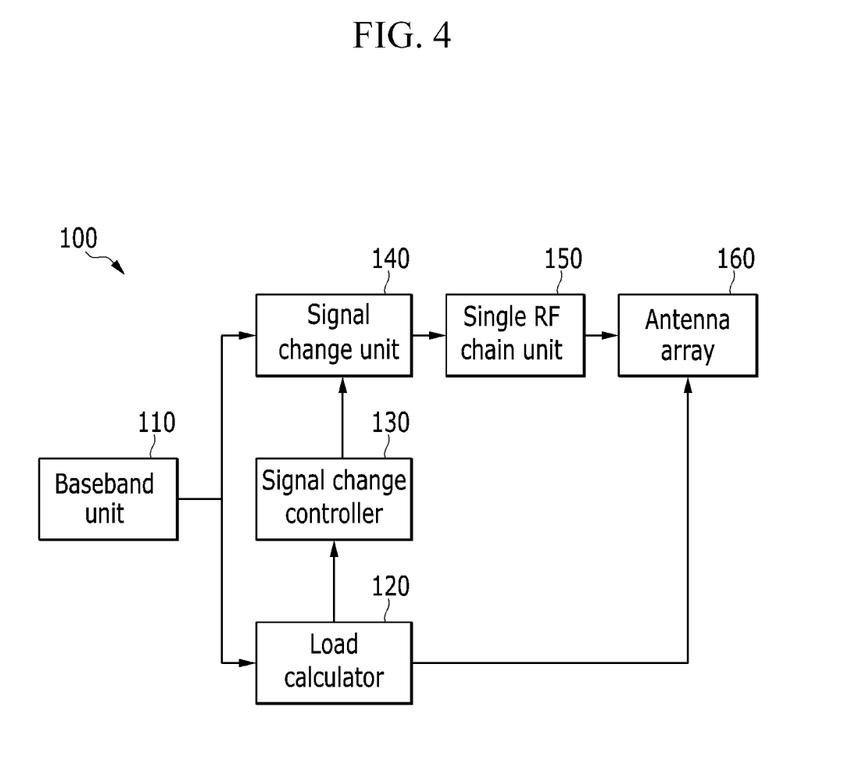
FIG. 4 is a block diagram illustrating a configuration of a baseband signal modulation apparatus in beam space MIMO according to an exemplary embodiment of the present invention.

FIG. 4 is a block diagram illustrating a configuration of a baseband signal modulation apparatus in beam space MIMO according to an exemplary embodiment of the present invention.

As shown in FIG. 4, in beam space MIMO according to an exemplary embodiment of the present invention, a baseband signal modulation apparatus 100 includes a baseband unit 110, a load calculator 120, a signal change controller 130, a signal change unit 140, a single RF chain unit 150, and an antenna array 160.

The baseband unit 110 generates a baseband signal to transmit. A method in which the baseband unit 110 generates a baseband signal may be generally understood by a person of ordinary skill in the art and thus a detailed description thereof will be omitted.

The load calculator 120 calculates a load value of each antenna element (parasitic antenna element) that is included in the antenna array 160 using a baseband signal. That is, the load calculator 120 calculates each load value corresponding to a baseband signal (symbol). The load calculator 120 sets a load value of the antenna array 160 to correspond to the calculated load value, thereby implementing beam space MIMO technology. A method in which the load calculator 120 calculates a load value using a baseband signal may be generally understood by a person of ordinary skill in the art and thus a detailed description thereof will be omitted.

The signal change controller 130 receives an input of a load value that is calculated by the load calculator 120, and sets a phase or magnitude change value so that a phase change or a magnitude change is the same on each baseband signal (symbol) basis using the received load value. In order to change a phase or a magnitude of a baseband signal according to a preset phase or magnitude change value, the signal change controller 130 controls the signal change unit 140. That is, the signal change controller 130 according to an exemplary embodiment of the present invention sets a change value (phase or magnitude change value) so that a phase change or a magnitude change is the same on each symbol basis. The signal change controller 130 may calculate a phase difference (change) of only a baseband signal having the same phase and set a phase change value so that a phase change of a baseband signal having the same phase is constant. Further, the signal change controller 130 may calculate a magnitude ratio (change or difference) of only a baseband signal having the same magnitude and set a magnitude change value so that a magnitude change of a baseband signal having the same magnitude is constant.

A load value that is calculated by the load calculator 120 and a load value that is actually implemented in the antenna array 160 may be different. For this reason, the signal change controller 130 may receive an input of an actual load value of the antenna array 160 to set the change value.

The signal change unit 140 changes a phase or a magnitude of a baseband signal (symbol) by the control of the signal change controller 130. In order to change a phase, the signal change unit 140 may be implemented with a phase shifter. In order to change a magnitude, the signal change unit 140 may be implemented with an amplifier or an attenuator. That is, the signal change unit 140 according to an exemplary embodiment of the present invention compensates a phase or a magnitude of a baseband signal to correspond to a change value (phase or magnitude change value) that is set to the signal change controller 130.

The single RF chain unit 150 forms one RF chain and converts a baseband signal in which a magnitude or a phase is changed to an RF band signal. Here, one RF chain may be implemented with a digital analog converter (DAC), a filter, and an oscillator. The single RF chain unit 150 may be the small number of RF chains instead of one RF chain.

In order to generate a beam space MIMO signal, the antenna array 160 may include one active antenna and a plurality of parasitic antennas. The antenna array 160 may be implemented through ESPAR, a switched parasitic array (SPA), and a load modulation antenna, and in order to implement beam space MIMO, the antenna array 160 may have other structures. The antenna array 160 may set a load value of a plurality of parasitic antennas according to a load value that is calculated by the load calculator 120.

In a method of changing a signal itself, as in a first method, an RF band signal may be changed instead of changing a baseband signal, as shown in FIG. 4. In this way, a method of changing an RF band signal will be described with reference to FIG. 5.

Figure 5:
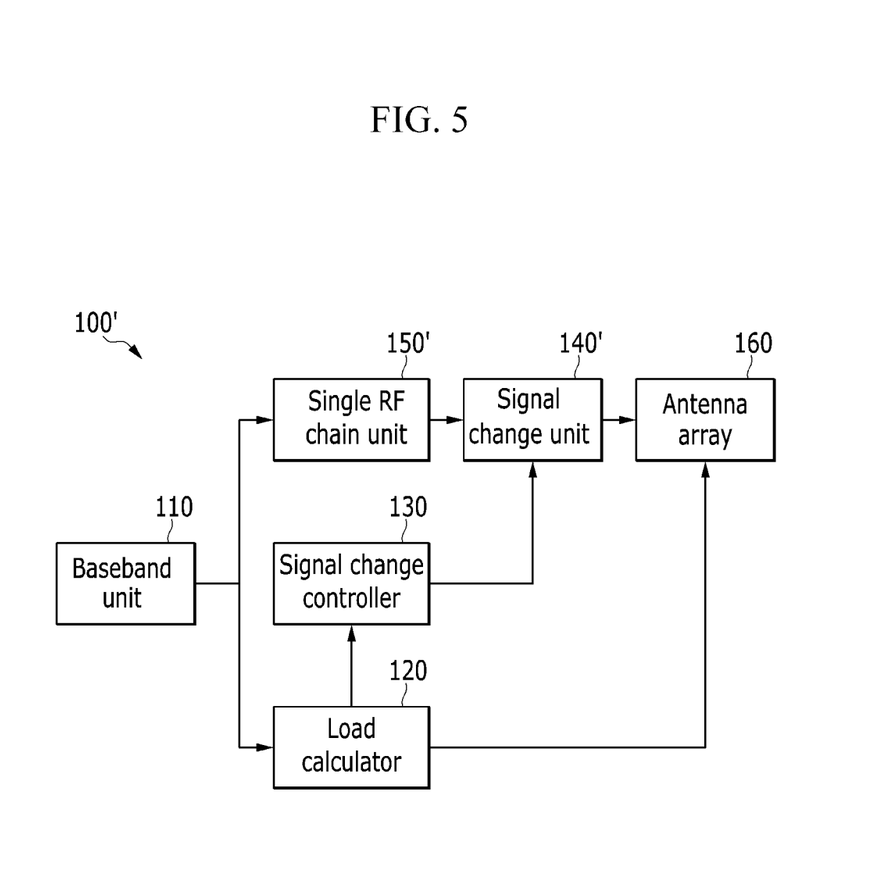
FIG. 5 is a block diagram illustrating a configuration of a baseband signal modulation apparatus in beam space MIMO according to another exemplary embodiment of the present invention.

FIG. 5 is a block diagram illustrating a configuration of a baseband signal modulation apparatus in beam space MIMO according to another exemplary embodiment of the present invention. In FIG. 5, a change of a baseband signal is the same as that of FIG. 4, except for a change of an RF band signal.

As shown in FIG. 5, in beam space MIMO according to another exemplary embodiment of the present invention, a baseband signal modulation apparatus 100' includes a baseband unit 110, a load calculator 120, a signal change controller 130, a signal change unit 140', a single RF chain unit 150', and an antenna array 160. In FIG. 5, unlike FIG. 4, the signal change unit 140' is located at a rear stage of the single RF chain unit 150'.

The baseband unit 110 generates a baseband signal to transmit.

The load calculator 120 calculates a load value of each antenna element (parasitic antenna element) that is included in the antenna array 160 using a baseband signal.

The signal change controller 130 receives an input of a load value that is calculated by the load calculator 120, and sets a phase or magnitude change value so that a phase change or a magnitude change is the same on each baseband signal (symbol) basis using the received load value.

The single RF chain unit 150' converts a baseband signal to an RF band signal. Here, the single RF chain unit 150' may include an IF band converter (not shown) that converts a baseband signal to an intermediate frequency (IF) band signal. When the single RF chain unit 150' includes an IF band converter, the single RF chain unit 150' converts an IF band signal to an RF band signal. In this case, the IF band signal and the RF band signal have a high frequency as a frequency of a baseband signal. Therefore, the single RF chain unit 150' and the IF band converter may be referred to as a band converter.

The signal change unit 140' changes a phase or a magnitude of an RF band signal (symbol) by the control of the signal change controller 130. The signal change unit 140' may change a phase or a magnitude of an IF band by the control of the signal change controller 130. Hereinafter, for convenience of description, it is described that a phase or a magnitude of an RF band signal is changed, but a phase or a magnitude of an IF band signal instead of an RF band signal may be changed.

In order to generate a beam space MIMO signal, the antenna array 160 may include one active antenna and a plurality of parasitic antennas. The antenna array 160 may set a load value of a plurality of parasitic antennas according to a load value that is calculated by the load calculator 120.

In FIGS. 4 and 5, only one of a phase or a magnitude may be changed or both a phase and a magnitude may be changed. In this case, when only a phase is changed, the signal change unit 140 may be implemented with only a phase shifter, and when only a magnitude is changed, the signal change unit 140 may be implemented with only an amplifier or an attenuator.

In FIG. 5, the signal change unit 140' may be included in the single RF chain unit 150' to change an RF band signal within the single RF chain unit 150'.

Figure 6:
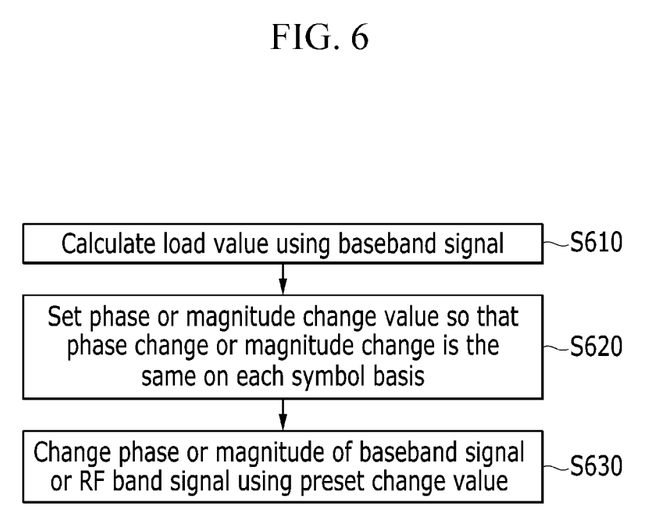
FIG. 6 is a flowchart illustrating a method of modulating a baseband signal in beam space MIMO according to an exemplary embodiment of the present invention.

FIG. 6 is a flowchart illustrating a method of modulating a baseband signal in beam space MIMO according to an exemplary embodiment of the present invention.

First, the load calculator 120 calculates a load value using a baseband signal (S610). The load calculator 120 calculates a load value of each parasitic antenna (parasitic antenna of the antenna array 160) corresponding to a baseband signal.

The signal change controller 130 sets a phase or magnitude change value so that a phase change or a magnitude change is the same on each symbol (baseband signal) basis using the load value that is calculated at step S610 (S620). That is, the signal change controller 130 sets a change value (phase or magnitude change value) so that a phase change or a magnitude change of a signal that is finally emitted through an antenna is the same on each symbol basis. The signal change controller 130 may calculate a phase difference (change) of only a baseband signal having the same phase and set a phase change value so that a phase change of a baseband signal having the same phase is constant. The signal change controller 130 may calculate a magnitude ratio (change or difference) of only a baseband signal having the same magnitude and set a magnitude change value so that a magnitude change of a baseband signal having the same magnitude is constant.

The signal change unit 140 (or 140') changes a phase or a magnitude of a baseband signal or an RF band signal using the change value that is set at step S620 (S630).

In this way, a baseband signal (or an RF band signal) having a compensated phase or magnitude is finally input to the antenna array 160, thereby compensating a change of a phase or a magnitude according to a load value.

Hereinafter, a method of providing an additional condition to calculation of a load value, which is a second method, will be described with reference to FIGS. 7 and 8.

The second method is a method of adding a condition of a phase or a magnitude according to a load value to calculation of a load value.

Figure 7:
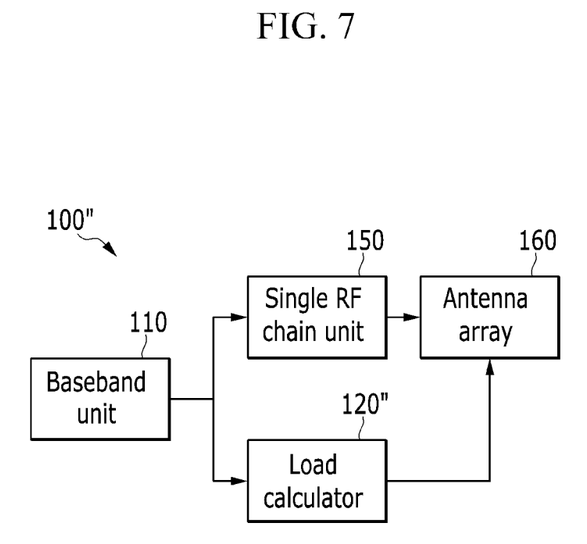
FIG. 7 is a block diagram illustrating a configuration of a baseband signal modulation apparatus in beam space MIMO according to another exemplary embodiment of the present invention.
Figure 8:
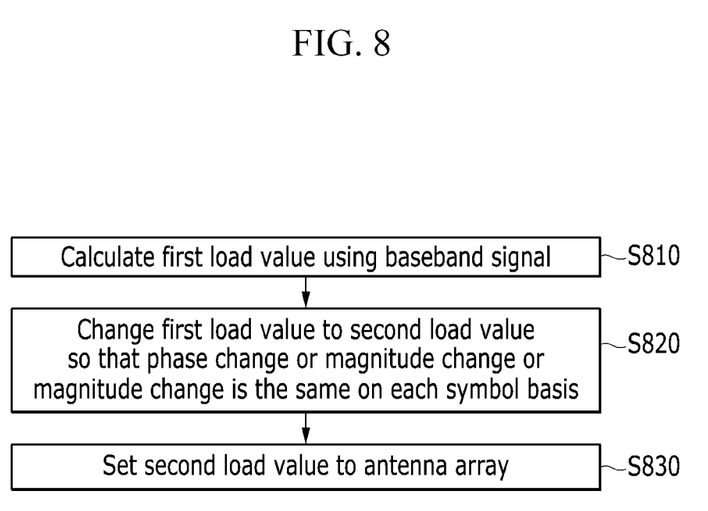
FIG. 8 is a flowchart illustrating a method of modulating a baseband signal in beam space MIMO according to another exemplary embodiment of the present invention.

FIG. 7 is a block diagram illustrating a configuration of a baseband signal modulation apparatus in beam space MIMO according to another exemplary embodiment of the present invention, and FIG. 8 is a flowchart illustrating a method of modulating a baseband signal in beam space MIMO according to another exemplary embodiment of the present invention.

As shown in FIG. 7, in beam space MIMO according to another exemplary embodiment of the present invention, a baseband signal modulation apparatus 100" includes a baseband unit 110, a load calculator 120", a single RF chain unit 150, and an antenna array 160.

The baseband unit 110 generates a baseband signal to transmit.

The load calculator 120" calculates a load value of each antenna element that is included in the antenna array 160 using a baseband signal. In this case, the load calculator 120" provides an additional condition to calculation of a load value. A method of providing an additional condition will be described with reference to FIG. 8.

First, the load calculator 120" calculates a first load value using a baseband signal (S810). Here, the first load value is a load value that considers only a baseband signal without considering a change of a phase or a magnitude. When only such a first load value is set to the antenna array 160, a phase change or a magnitude change may be changed on each symbol basis. In order to compensate this, the load calculator 120" changes a first load value to a second load value so that a phase change or a magnitude change is the same on each baseband signal (symbol) basis (S820). Here, when it is unnecessary to change a phase or a magnitude, a second load value may be the same as a first load value. The load calculator 120" sets a second load value to the antenna array 160 (S830). That is, a second load value is finally set to a load value of the antenna array 160, thereby compensating a phase or magnitude change according to a load value that may occur in beam space MIMO.

The single RF chain unit 150 converts a baseband signal to an RF band signal. The antenna array 160 may include one active antenna and a plurality of parasitic antennas. In this case, the antenna array 160 may set a load value of a plurality of parasitic antennas according to a second load value that is calculated by the load calculator 120".

In the foregoing description, a case that should compensate a phase of a baseband signal is a case of transferring information through a phase. A representative example thereof is a phase shift keying (PSK) modulation method. A case that should compensate a magnitude of a baseband signal is a case of transferring information through a magnitude. A representative example thereof is an amplitude shift keying (ASK) modulation method. A case that should compensate both a magnitude and a phase of a baseband signal is a case of transferring information through a magnitude and a phase. A representative example thereof is a quadrature amplitude modulation (QAM) method.

In the ASK modulation method, even if phase information is not compensated, information may be transferred. In the PSK modulation method, even if magnitude information is not compensated, information may be transferred. However, in a case of a magnitude, because a limitation exists in a capacity of a power amp, even in a PSK method, a limitation of the magnitude may exist so that the magnitude does not become a specific magnitude or more according to a situation.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A baseband modulation apparatus, comprising:
    an antenna array comprising an electrical steering parasitic array radiation (ESPAR) load modulation structure having a plurality of antenna elements and that emits a beam space multi-input multi-output (MIMO) signal;
    a baseband unit that generates a baseband signal;
    a band converter that converts the baseband signal to a first band signal having a higher frequency than that of the baseband signal;
    a load calculator that receives as an input the baseband signal and calculates a load value of the plurality of antenna elements using the baseband signal received as the input and that sets the calculated load value to a variable impedance of the plurality of antenna elements;
    a signal change controller that sets a change value of at least one of a phase and a magnitude of the baseband signal to correspond to the calculated load value; and
    a signal change unit that changes at least one of the baseband signal and the first band signal to correspond to the change value.

2. The baseband modulation apparatus of claim 1, wherein the signal change controller sets the change value so that at least one of a phase change and a magnitude change of an antenna signal that is emitted through the antenna array is the same on each baseband signal basis.

3. The baseband modulation apparatus of claim 1, wherein the signal change controller sets the change value so that a phase change of an antenna signal that is emitted through the antenna array is the same on a baseband signal basis having the same phase.

4. The baseband modulation apparatus of claim 1, wherein the signal change controller sets the change value so that a magnitude change of an antenna signal that is emitted through the antenna array is the same on a baseband signal basis having the same magnitude.

5. The baseband modulation apparatus of claim 1, wherein the signal change unit is located between the baseband unit and the band converter, when the signal change unit changes the baseband signal.

6. The baseband modulation apparatus of claim 1, wherein the signal change unit is located between the band converter and the antenna array, when the signal change unit changes the first band signal.

7. The baseband modulation apparatus of claim 1, wherein the signal change unit is implemented with at least one of a phase shifter, an amplifier, and an attenuator.

8. The baseband modulation apparatus of claim 1, wherein the plurality of antenna elements comprise an active antenna element and a plurality of parasitic antennas elements, and the band converter is a single radio frequency (RF) chain.

9. The baseband modulation apparatus of claim 1, wherein the first band signal is an intermediate frequency (IF) band signal or an RF band signal.

10. A baseband modulation apparatus, comprising:
an antenna array comprising an electrical steering parasitic array radiation (ESPAR) load modulation structure having a plurality of antenna elements and that emits a beam space MIMO signal;
a baseband unit that generates a baseband signal;
an RF chain unit that converts the baseband signal to a radio frequency (RF) band signal; and
a load calculator that receives as an input the baseband signal, calculates a first load value based on the baseband signal received, the first load value being a load value of the plurality of antenna elements, so that at least one of a phase change and a magnitude change of an antenna signal that is emitted through the antenna array is the same on each baseband signal basis, and that sets the first load value to a variable impedance of the plurality of antenna elements,
wherein the antenna array receives as inputs the RF band signal and the first load value to control the load value of the plurality of antenna elements.

11. The baseband modulation apparatus of claim 10, wherein the load calculator calculates a second load value, which is a load value of the variable impedance of the plurality of antenna elements, using the baseband signal, and changes the second load value to the first load value so that at least one of a phase change and a magnitude change of the antenna signal is the same on the baseband signal basis.

12. The baseband modulation apparatus of claim 10, wherein the plurality of antenna elements comprise an active antenna element and a plurality of parasitic antennas elements, and the RF chain unit is a single RF chain.

13. A method of modulating a baseband signal in beam space multi-input multi-output (MIMO) comprising an electrical steering parasitic array radiation (ESPAR) load modulation structure having a plurality of antenna elements, the method comprising:
generating the baseband signal;
converting the baseband signal to a first band signal having a higher frequency than that of the baseband signal;
calculating, by a load calculator receiving the baseband signal as an input, a load value of a variable impedance of the plurality of antenna elements using the baseband signal; and
changing a phase or a magnitude of the baseband signal or the first band signal to correspond to the calculated load value.

14. The method of claim 13, wherein the changing of a phase or a magnitude comprises:
setting a change value of a phase or a magnitude of the baseband signal or the first band signal to correspond to the calculated load value; and
changing the baseband signal or the first band signal to correspond to the change value.

15. The method of claim 14, wherein the setting of a change value comprises setting the change value so that a phase change or a magnitude change of an antenna signal that is emitted through the plurality of antenna elements is the same on the baseband signal basis.

16. The method of claim 14, wherein the setting of a change value comprises setting the change value so that a phase change of an antenna signal that is emitted through the plurality of antenna elements is the same on a baseband signal basis having the same phase.

17. The method of claim 14, wherein the setting of a change value comprises setting the change value so that a magnitude change of an antenna signal that is emitted through the plurality of antenna elements is the same on a baseband signal basis having the same magnitude.

18. The method of claim 13, wherein the first band signal is an intermediate frequency (IF) band signal or a radio frequency (RF) band signal.

* * * * *